(12) United States Patent
Kocha

(10) Patent No.: US 7,594,334 B2
(45) Date of Patent: Sep. 29, 2009

(54) VIBRATION-ABSORBING COUPLER AND PORTABLE BRUSH CUTTER PROVIDED WITH THE VIBRATION-ABSORBING COUPLER

(75) Inventor: Masaharu Kocha, Saitama (JP)

(73) Assignee: Kioritz Corporation, Tokyo (JP)

( * ) Notice: Subject to any disclaimer, the term of this patent is extended or adjusted under 35 U.S.C. 154(b) by 367 days.

(21) Appl. No.: 11/512,660

(22) Filed: Aug. 30, 2006

(65) Prior Publication Data
US 2007/0044321 A1 Mar. 1, 2007

(30) Foreign Application Priority Data
Sep. 1, 2005 (JP) ............... 2005-252980

(51) Int. Cl.
*B26B 7/00* (2006.01)
(52) U.S. Cl. ............... 30/276; 30/347; 56/12.6; 464/57
(58) Field of Classification Search ............... 30/276, 30/347; 56/11.3, 11.5, 11.7, 11.8, 12.6, 12.7; 464/51, 57; 192/54.1, 54.2, 55.1–55.3, 55.5
See application file for complete search history.

(56) References Cited
U.S. PATENT DOCUMENTS
2,616,274 A * 11/1952 Landrum ............... 464/57
3,002,594 A * 10/1961 Haseler et al. ............... 192/223.4
5,389,040 A * 2/1995 Kakimi ............... 464/57

FOREIGN PATENT DOCUMENTS
| EP | 0 807 768 | 11/1997 |
|---|---|---|
| FR | 2 870 903 | 12/2005 |
| JP | 56-53618 | 12/1981 |
| JP | 2001330053 | 11/2001 |
| JP | 2003-088220 A | 3/2003 |
| JP | 2005-168339 A | 6/2005 |

* cited by examiner

*Primary Examiner*—Phong H Nguyen
(74) *Attorney, Agent, or Firm*—Baker Botts L.L.P.

(57) ABSTRACT

A vibration-absorbing coupler (30A) which is capable of suppressing the torsional vibration of the transmission shaft (7) and also capable of enhancing the durability thereof is disclosed. This vibration-absorbing coupler (30A) is featured in that the rotation of an output shaft (31) of an internal combustion engine (6) is enabled to transmit to a transmission shaft (7) through a torsion coil spring (40A) and torsional vibration of the transmission shaft (7) is enabled to be absorbed by the torsion coil spring (40A). The vibration-absorbing coupler (30A) further includes a regulator (50, 37A) for regulating the rotation of the torsion coil spring (40A) so as not to allow it to twist more than a predetermined angle.

6 Claims, 7 Drawing Sheets

VIBRATION-ABSORBING COUPLER AND PORTABLE BRUSH CUTTER PROVIDED WITH THE VIBRATION-ABSORBING COUPLER

FIELD

The present invention relates to a vibration-absorbing coupler which is capable of transmitting the rotation of the output shaft of a prime mover to a transmission shaft and also capable of absorbing the torsional vibration of the transmission shaft. The present invention also relates to a portable brush cutter equipped with this vibration-absorbing coupler.

BACKGROUND INFORMATION

FIG. 8 shows one example of a conventional portable brush cutter. This portable brush cutter 1' shown therein includes, at a distal end of the operating rod 2 thereof, a cutting blade mechanism 3 constituted by a cutting blade 4, a gear case (bevel gear unit) 19 and a safety cover 5. The portable brush cutter 1' also includes, at a proximal end of the operating rod 2 thereof, a centrifugal clutch-attached internal combustion engine (an air cooling type small two-stroke cycle gasoline engine) 6 equipped with a recoil starter 8 and a fuel tank 9. This engine 6 acts as a prime mover for driving the cutting blade 4 by way of a transmission shaft 7 installed inside the operating rod 2, the shaft 7 being coupled to a bevel gear unit.

Near the center portion of the operating rod 2, a U-shaped handle 10 for swinging the cutting blade mechanism 3 right and left or for moving it up and down is attached. A left grip 11 and a right grip 12 are mounted at left and right ends of this U-shaped handle 10, respectively. The portable brush cutter 1' constructed in this manner however is accompanied with a problem that, due to the fluctuation of torque, the fluctuation of rotational speed, and the fluctuation of load to be imposed on the cutting blade 4 on the occasion of accelerating or decelerating the engine, torsional vibration occurs at the transmission shaft 7. More specifically, since the diameter of the transmission shaft 7 is small in comparison to its length (for example, 6 mm in diameter and about 1500 mm in length), when the rotational speed of engine or the load to be imposed on the cutting blade 4 is increased, the transmission shaft 7 gets distorted (rotational delay). Further, when the load acting on the cutting blade 4 is suddenly reduced, a phenomenon of spring back occurs in the transmission shaft 7, whereby the transmission shaft 7 is permitted to overrun in the rotating direction thereof and twisted. Due to the fluctuation of torque, the fluctuation of rotational speed, the fluctuation of load on the cutting blade, and the spring back phenomenon on the occasion of accelerating or decelerating the engine as described above, the transmission shaft 7 twists or reverts in the rotating direction or in the backward direction, thus generating the torsional vibration.

This torsional vibration of the transmission shaft 7 is then transmitted, through the operating rod 2 and the handle 10, to the hands of a working operator. This kind of vibration may not only lead to the deterioration of operating performance of the cutter and to the increase of fatigue but also may become a cause for a white finger disease especially when the operation of the cutter is continued for long hours. Therefore, to take measures for suppressing this torsional vibration is now an important issue in the manufacture of this portable brush cutter.

JP Utility Model Publication No. 56-53618 (1981) proposes one of the measures to suppress the torsional vibration, wherein a coupler formed of vibration proof rubber is interposed between the centrifugal clutch and the transmission shaft.

JP Patent Laid-open Publication (Kokai) No. 2003-88220 (2003) proposes another measures to suppress the torsional vibration, wherein a one-way clutch is interposed between the centrifugal clutch and the transmission shaft.

There has been also studied, as alternative one of the measures to suppress the torsional vibration, to interpose a torsion coil spring between the centrifugal clutch and the transmission shaft.

However, these conventional measures to use a coupler formed of vibration proof rubber, a one-way clutch or a torsion coil spring for suppressing the torsional vibration are not fully effective, even though some degree of effects to suppress the torsional vibration can be obtained.

Specifically, when a coupler formed of vibration proof rubber is used, the coupler generally has poor durability. Further, even when a torsion coil spring is used, the torsion coil spring may be deformed beyond its elastic limits depending on the twisting direction or the magnitude of twist (angle of torsion) of the transmission shaft. This may result in the torsion coil spring becoming easily fractured and hence deteriorating the durability thereof.

The present invention has been made with a view to overcome the problems of prior art described above, and therefore an object of the present invention is to provide a vibration-absorbing coupler which is capable of effectively suppressing the torsional vibration of transmission shaft and of enhancing the durability thereof. Another object of the present invention is to provide a portable brush cutter equipped with such a vibration-absorbing coupler.

BRIEF SUMMARY OF THE INVENTION

With a view to realize the aforementioned object, the vibration-absorbing coupler according to one aspect of the present invention includes a torsion coil spring, so that the rotation of the output shaft of a prime mover is enabled to transmit to a transmission shaft via the torsion coil spring and a torsional vibration of the transmission shaft is enabled to be absorbed by the torsion coil spring; and further includes a rotation-regulator for regulating the torsion coil spring so as to prevent the spring from twisting more than a predetermined angle.

According to another aspect of the present invention, the vibration-absorbing coupler includes a movable sleeve having spline female teeth which are slidably engaged with spline male teeth formed on the transmission shaft; a cylindrical connector which is adapted to be rotated integral with the output shaft and in which the movable sleeve is slidably inserted; a torsion coil spring interposed between the movable sleeve and a spring shoe attached to the cylindrical connector, one end portion of the torsion coil spring being anchored to an anchor portion provided in the spring shoe and the other end portion thereof being anchored to an anchor portion provided in the movable sleeve; and a rotation-regulator mounted on both of the movable sleeve and the cylindrical connector.

According to another aspect of the present invention, the rotation-regulator includes a protrusion or a pin attached to the movable sleeve, and a groove or a slot into which end portions of the protrusion or the pin are inserted, wherein the protrusion or the pin is prevented from further moving by the opposite end portions of the groove or the slot as the protrusion or the pin is turned around from the neutral position by a predetermined angle.

According to another aspect of the present invention, the cylindrical connector includes a plurality of grooves or slots which are juxtaposed at predetermined intervals along the rotational axis thereof.

According to another aspect of the present invention, a portable brush cutter includes, at a distal end of the operating rod thereof, a cutting blade mechanism constituted by a cutting blade, a gear case, and other appropriate components; and also includes, at a proximal end of the operating rod thereof, a prime mover for driving the cutting blade through a transmission shaft installed inside the operating rod; wherein one of the aforementioned vibration-absorbing couplers is interposed between the output shaft of the prime mover and the transmission shaft.

According to another aspect of the present invention, a portable brush cutter includes, at a distal end of the operating rod thereof, a cutting blade mechanism constituted by a cutting blade, a gear case, and other appropriate components; and includes, at a proximal end of the operating rod thereof, a centrifugal clutch-attached internal combustion engine for driving the cutting blade through a transmission shaft installed inside the operating rod; and also includes, at an intermediate portion between the centrifugal clutch and the transmission shaft, a vibration-absorbing coupler; wherein the vibration-absorbing coupler includes a movable sleeve having spline female teeth which are slidably engaged with spline male teeth formed on the transmission shaft; a cylindrical connector which is mounted integral with a boss portion of the drum of the centrifugal clutch and in which the movable sleeve is slidably inserted; a torsion coil spring interposed between the movable sleeve and a spring shoe attached to the cylindrical connector, one end portion of the torsion coil spring being anchored to an anchor portion provided in the spring shoe and the other end portion thereof being anchored to an anchor portion provided in the movable sleeve; and a rotation-regulator mounted on both of the movable sleeve and the cylindrical connector.

In the case of the vibration-absorbing coupler according to the present invention which is constructed as described above, the torsional vibration of the transmission shaft that may be caused by the fluctuation of torque, by the fluctuation of rotational speed, by the fluctuation of load on the cutting blade, or by the spring back phenomenon on the occasion of accelerating or decelerating the engine can be absorbed by the torsion coil spring which is built therein. Additionally, the torsion coil spring is regulated by the rotation-regulator so as to prevent the torsion coil spring from twisting more than a predetermined angle. Therefore, it is possible not only to effectively suppress the torsional vibration of the transmission shaft (i.e., undesirable vibration that will be transmitted to an operator's hands) but also to minimize the twisting angle (the magnitude of elastic deformation) of the torsion coil spring as compared with the case where this rotation-regulator is not provided. As a result, it is possible to prevent the torsion coil spring from being easily damaged and to enhance the durability of the torsion coil spring.

Further, according to the portable brush cutter equipped with this vibration-absorbing coupler, it is possible to effectively suppress the undesirable vibration that may be transmitted to the operator's hands through the operating rod or the handle.

DETAILED DESCRIPTION OF THE PREFERRED EMBODIMENTS

Next, various embodiments of the vibration-absorbing coupler according to the present invention will be explained with reference to the drawings.

Figure 1:
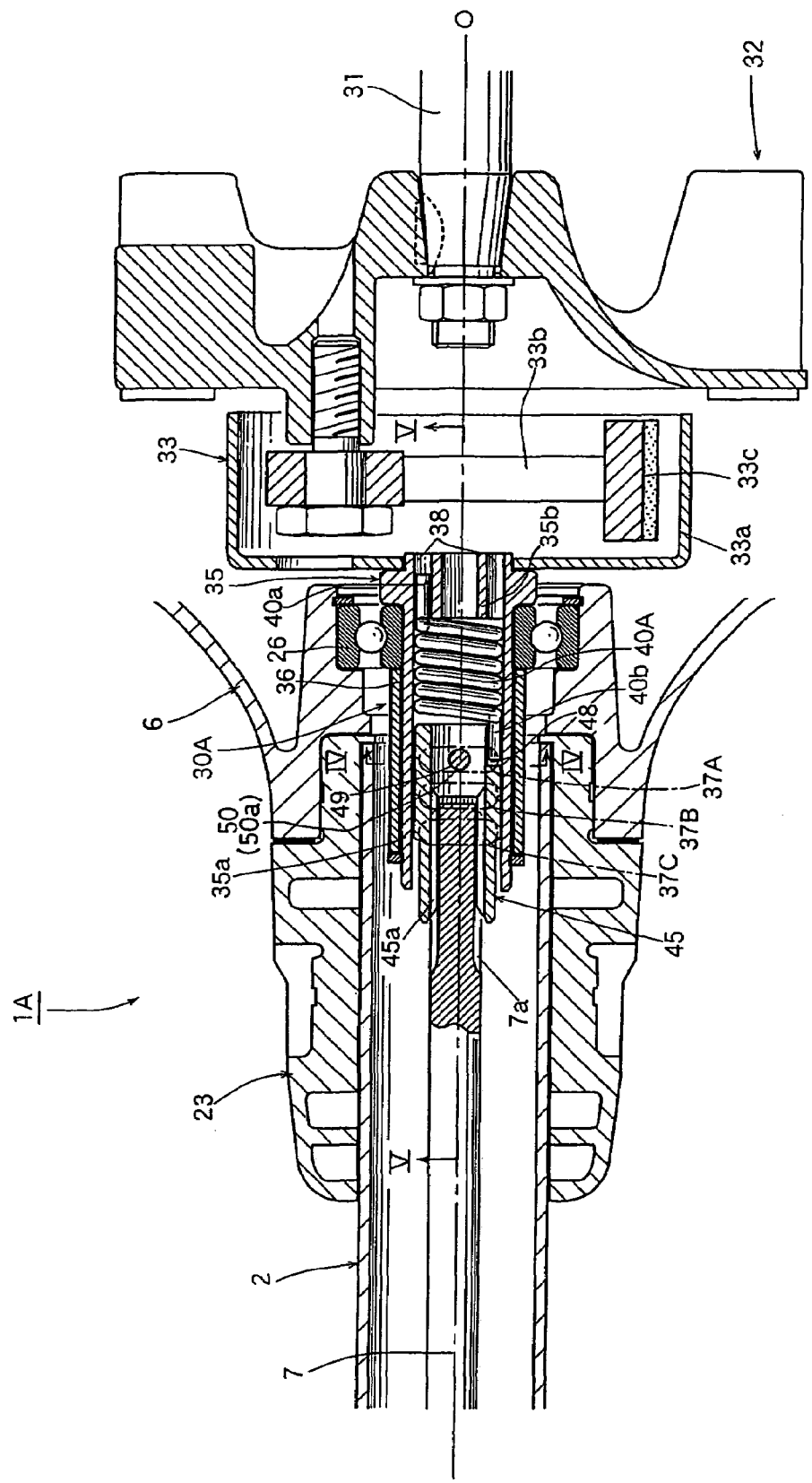
FIG. 1 is a cross-sectional view of one exemplary embodiment of a main portion of a portable brush cutter including a vibration-absorbing coupler according to the present invention.
Figure 2:
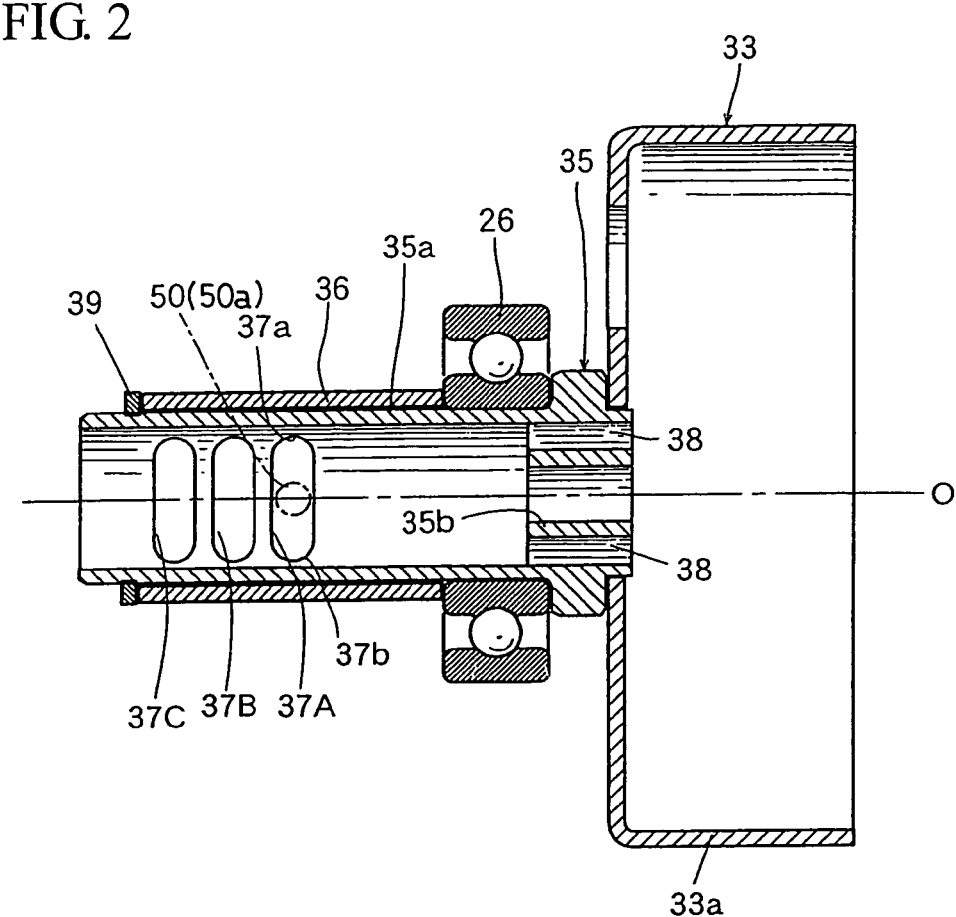
FIG. 2 is a cross-sectional view of the cylindrical connector shown in FIG. 1 and slots formed therein.
Figure 3:
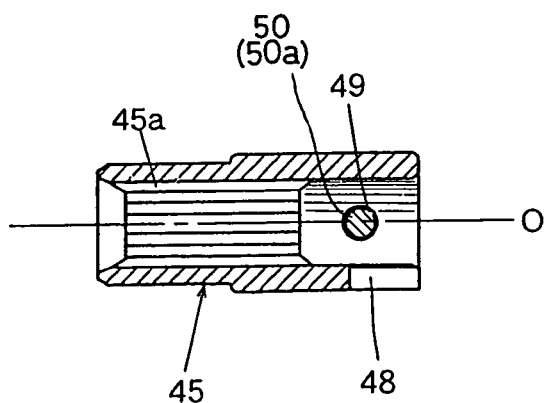
FIG. 3 is a cross-sectional view of the movable sleeve shown in FIG. 1.

FIG. 1 is a cross-sectional view illustrating a main portion of a portable brush cutter with a vibrational-absorbing coupler according to one exemplary embodiment of the present invention.

Figure 8:
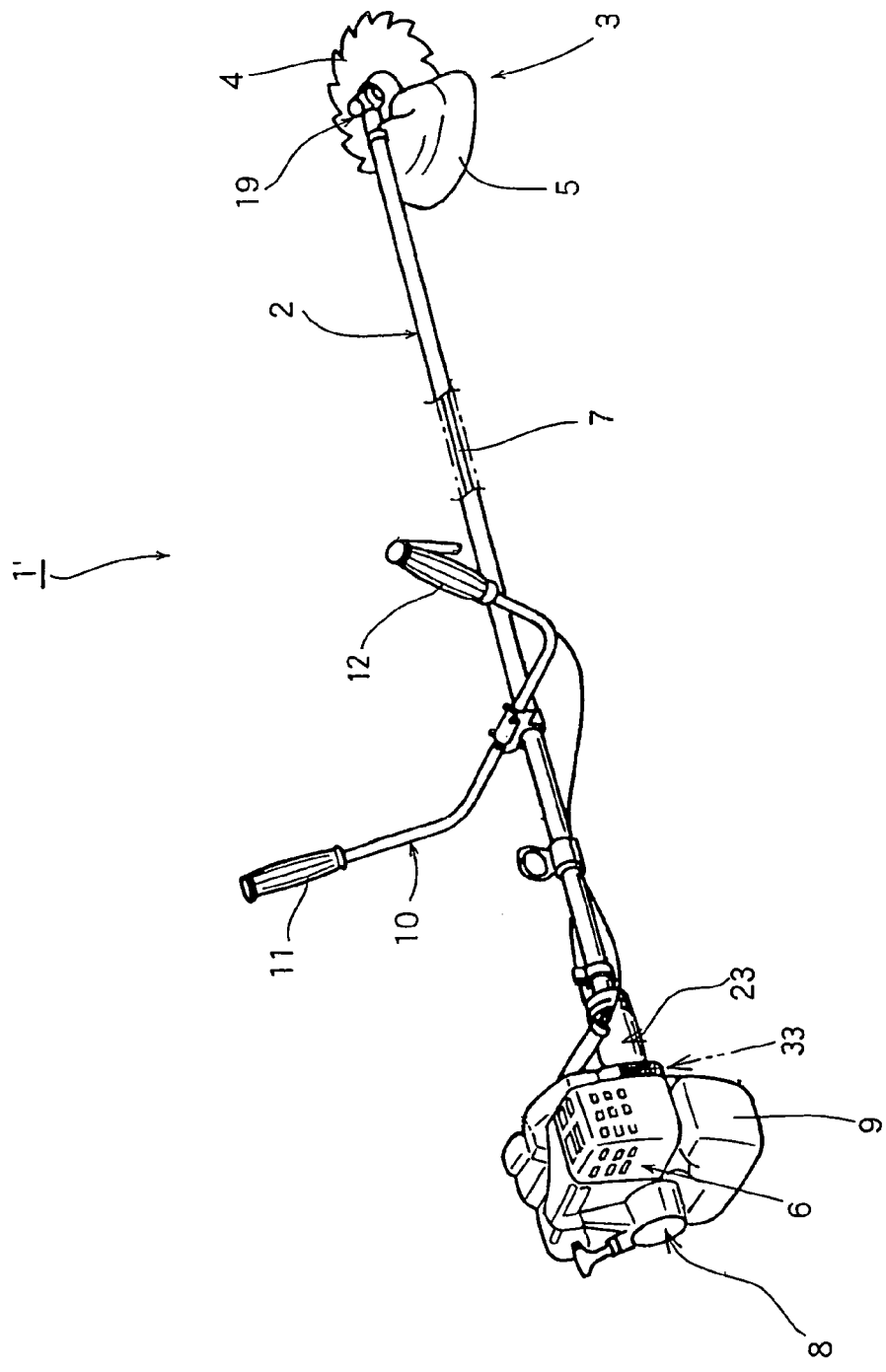
FIG. 8 is a perspective view showing one example of the conventional portable brush cutter.

The general structure of the portable brush cutter 1A shown in FIG. 1 is similar to that of the aforementioned portable brush cutter 1' shown in FIG. 8. Namely, this portable brush cutter 1A is equipped, at a distal end of the operating rod 2 thereof, with a cutting blade mechanism 3 constituted by a cutting blade 4, a gear case 19, and other appropriate components. The brush cutter 1A is also equipped, at a proximal end of the operating rod 2 thereof, with a centrifugal clutch (33) attached internal combustion engine (an air cooling type small two-stroke cycle gasoline engine) 6 for driving the cutting blade 4 via a transmission shaft 7 which is installed inside the operating rod 2. This internal combustion engine 6 is attached to the operating rod 2 by making use of a fixture 23, and a vibration-absorbing coupler 30A of this embodiment is interposed between the centrifugal clutch 33 and the transmission shaft 7.

The output shaft (crankshaft) 31 of the internal combustion engine 6 is connected, via a cooling fan 32, to the centrifugal clutch 33. The centrifugal clutch 33 is constituted by a clutch arm 33b which is designed to be rotated by the output shaft 31, a shoe 33c secured to a distal end of the clutch arm 33b, and a clutch drum 33a which is designed to be rotated integral with the shoe 33c as it is frictionally engaged with the shoe 33c.

The vibration-absorbing coupler 30A is equipped with a movable sleeve 45 having spline female teeth 45a which are slidably engaged with spline male teeth 7a formed on the transmission shaft 7, a cylindrical connector 35 which is integrally connected, as a boss portion, with the clutch drum 33a, and a torsion coil spring 40A.

The cylindrical connector 35 is rotatably supported, through a bearing 26, by the fixture 23, and a bearing-fixing cylinder 36 is externally engaged with an outer circumference of a cylindrical portion 35a of the cylindrical connector 35.

The movable sleeve 45 is slidably inserted into one end portion (positioned close to the transmission shaft 7) of the cylindrical connector 35.

The torsion coil spring 40A is interposed, in a free state, between the movable sleeve 45 and a spring shoe 35b attached to the cylindrical connector 35, one end portion 40a of the torsion coil spring 40A being inserted into and anchored to one of anchor portions 38 formed, as a plurality of through-holes, in the spring shoe 35b and along the rotational axial line "O" of the output shaft 31. The other end portion 40b of the torsion coil spring 40A is anchored to an anchor portion 48 formed in the movable sleeve 45 and along the rotational axial line "O" of the output shaft 31.

A rotation-regulator is formed in the movable sleeve 45 and also in the cylindrical connector 35 in such a manner that when the torsional angle of the transmission shaft 7 relative to the output shaft 31 is increased to more than a predetermined angle (θ/2), the output shaft 31 is substantially brought into a state of direct connection with the transmission shaft 7 so as to prevent the torsion coil spring 40A from being twisted any further.

Figure 4:
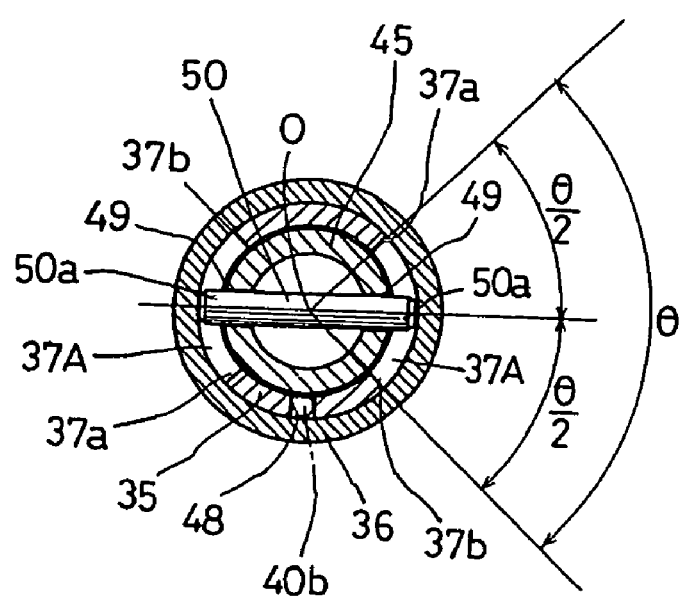
FIG. 4 is a cross-sectional view taken along the line IV-IV of FIG. 1.

As shown in FIGS. 1 to 5, this rotation-regulator may be constituted by a pin (it may be a simple protrusion) 50 radially extending from the rotation-regulator with the opposite ends 50a thereof penetrating through the movable sleeve 45 from the holes 49 formed in the movable sleeve 45, and by a slot (or groove) 37A which is formed in the cylindrical connector 35 and into which the opposite ends 50a of the pin 50 are enabled to be slidably inserted. The rotational range θ of the pin 50 is regulated by the opposite ends 37a and 37b of this slot 37A. Namely, as shown in FIG. 4, this slot 37A has a central angle θ of 90° for instance, so that the range of rotation of the pin 50 as measured from the neutral position (where the torsion coil spring 40A is made free) where the pin 50 is not rotated and is kept in a state of no-load is restricted to θ/2 in either direction, i.e. the rotational direction or the reverse direction. In this embodiment, a maximum magnitude of torsion (angle) θ/2 of the torsion coil spring 40A is determined by a half (a central angle θ/2) of the length (a central angle θ) of the slot 37A.

Figure 5:
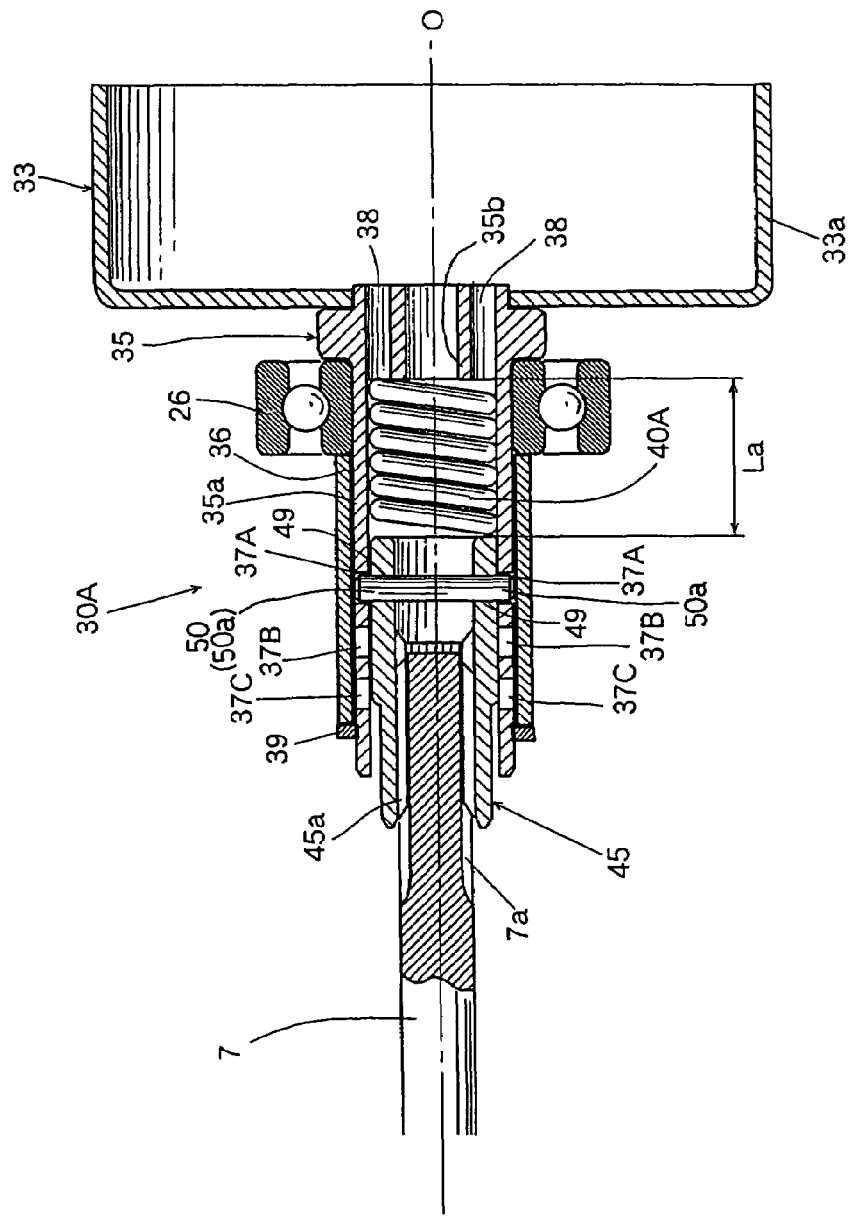
FIG. 5 is a cross-sectional view taken along the line V-V of FIG. 1.
Figure 6:
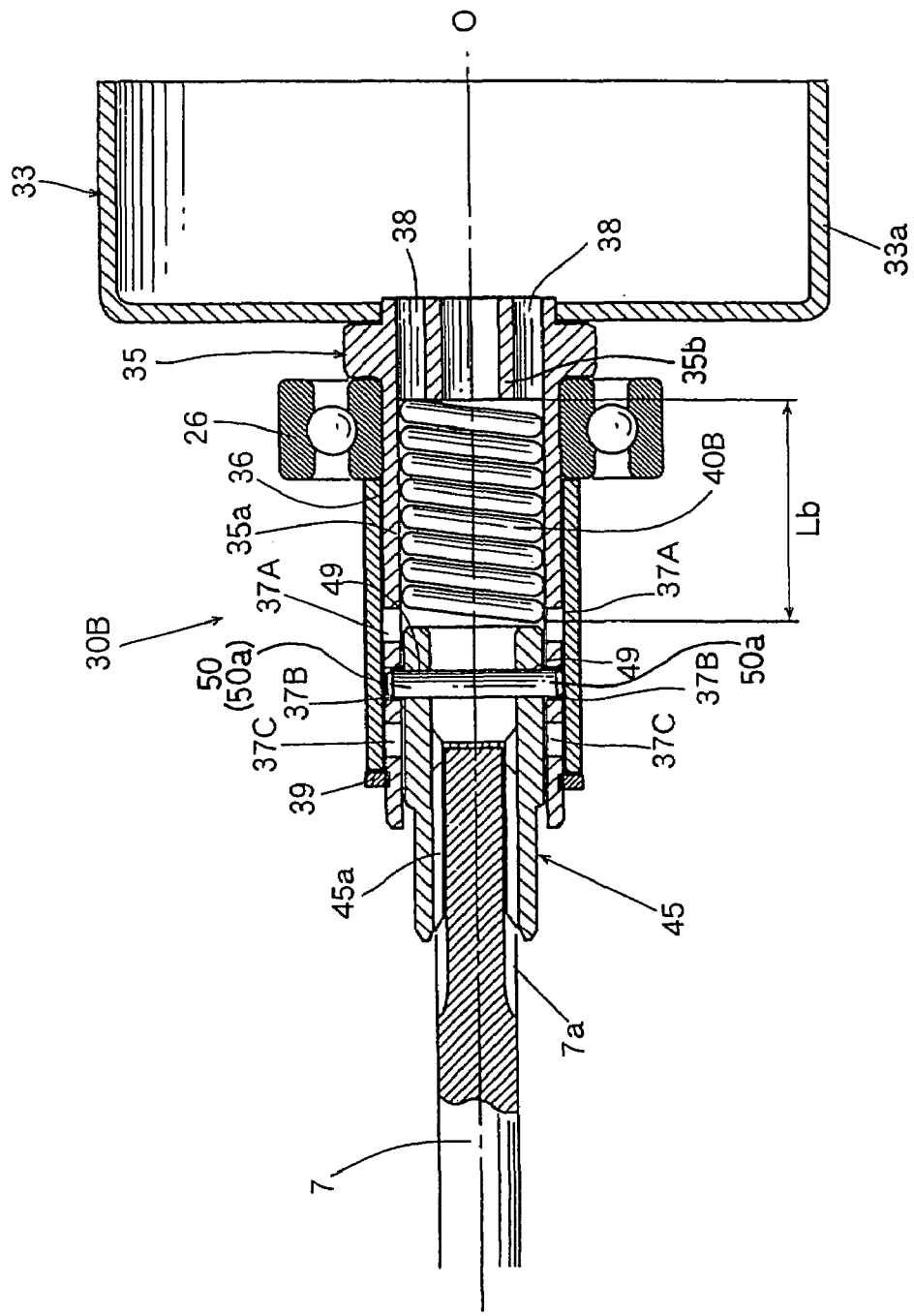
FIG. 6 is a cross-sectional view showing one example wherein the length of the torsion coil spring is changed in the vibration-absorbing coupler shown in FIG. 1.
Figure 7:
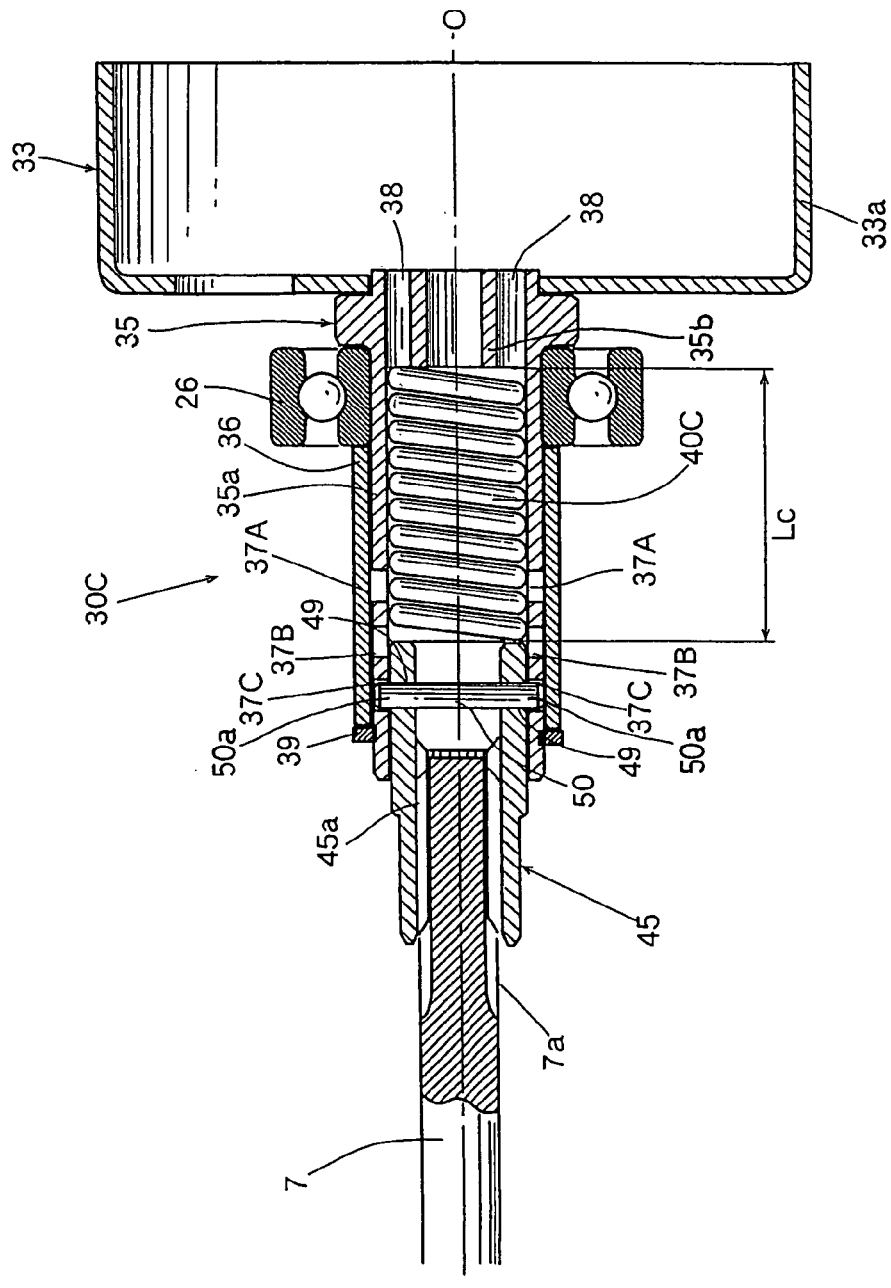
FIG. 7 shows a cross-sectional view showing one example wherein the length of the torsion coil spring is further changed in the vibration-absorbing coupler shown in FIG. 1.

In this vibration-absorbing coupler 30A, in order to make the components of other kinds of brush cutter interchangeable, the cylindrical connector 35 includes three slots 37A, 37B and 37e which are juxtaposed at predetermined intervals along the rotational axis thereof, thereby making it possible to optionally select a torsion coil spring having a suitable length in conformity with the properties of the engine to be employed. Namely, in the case of the vibration-absorbing coupler 30A shown in FIG. 5 representing this embodiment, the torsion coil spring 40A having a shortest length $L_a$ and the slot 37A located on the inner side are used. However, in the case of the vibration-absorbing coupler 30B shown in FIG. 6, the torsion coil spring 40B having an intermediate length $L_b$ and the slot 37B can be used. Further, in the case of the vibration-absorbing coupler 30C shown in FIG. 7, the torsion coil spring 40C having a longest length $L_c$ and the slot 37C can be employed.

In the case of the vibration-absorbing coupler 30A according to this embodiment which is constructed as described above, when the engine 6 (the output shaft 31) and the transmission shaft 7 are not actuated (in a state of no-load), the pin 50 is positioned at the neutral position (center) of the slot 37A as shown in FIGS. 1 and 5.

Whereas, when the rotational speed of engine is increased to more than a predetermined speed (for example, 3200 rpm) and the centrifugal clutch 33 is engaged (a connected state), the rotation of the output shaft 31 is successively transmitted in the following order: first, the centrifugal clutch 33 (clutch drum 33a); second, the cylindrical connector 35; third, the torsion coil spring 40A; fourth, the movable sleeve 45; fifth, the pin 50; sixth, the movable sleeve 45; and seventh, the transmission shaft 7, thereby enabling the transmission shaft 7 to rotate in the same direction as that of the output shaft 31.

Subsequently, as the rotational speed of engine is further increased, the transmission shaft 7 is caused to distort (rotational delay). When this distortion (rotational delay) occurs, the torsion coil spring 40A twists in conformity with the angle of distortion (rotational delay), thereby enabling the pin 50 to move toward one end portion 37a of the slot 37A.

When the rotational speed of engine is further increased to such an extent that the magnitude of torsion (angle) of the torsion coil spring 40A reaches a predetermined angle θ/2, the pin 50 is caused to reach one end portion 37a of the slot 37A and is locked at this position. Therefore, the torsion coil spring 40A is prevented from being twisted any further, thus rendering the cylindrical connector 35 to be substantially directly connected with the movable sleeve 45.

On the other hand, when the actuation of engine is suddenly changed from the aforementioned state of high speed to a state of low load, the transmission shaft 7 is caused to undergo a spring back phenomenon and to over-run in the rotational direction, thus twisting the transmission shaft 7. On this occasion, the torsion coil spring 40A is caused to twist in conformity with the angle of distortion of the transmission shaft 7, thereby enabling the pin 50 to move toward the other end portion 37b of the slot 37A.

As described above, in the case of the vibration-absorbing coupler 30A according to this embodiment, the torsional vibration of the transmission shaft 7 that may be caused by the fluctuation of torque, by the fluctuation of rotational speed, by the fluctuation of load on the cutting blade, or by the spring back phenomenon on the occasion of accelerating or decelerating the engine can be absorbed by the torsion coil spring 40A which is built therein. Additionally, the torsion coil spring 40A is regulated by the rotation-regulator 50 and 37A so as to prevent the torsion coil spring 40A from twisting more than a predetermined angle θ/2. Therefore, it is possible not only to effectively suppress the torsional vibration of the transmission shaft 7 (i.e. undesirable vibration that will be transmitted to an operator's hands) but also to minimize the twisting angle (the magnitude of elastic deformation) of the torsion coil spring 40A as compared with the case where such rotation-regulator (50 and 37A) is not provided. As a result, it is possible to prevent the torsion coil spring from being easily damaged and to enhance the durability of the torsion coil spring 40A.

Further, according to the portable brush cutter 1A equipped with this vibration-absorbing coupler 30A, it is possible to effectively suppress the undesirable vibration that may be transmitted to the operator's hands through the operating rod 2 or the handle 10.

In the foregoing description, the present invention has been explained with reference to specific embodiments. It should be appreciated however that the prevent invention is not limited to these embodiments but can be variously modified in design without departing from the spirit of invention defined by the claims accompanied herewith.

For example, in the embodiment shown in the drawings, the cylindrical connector 35 housing the torsion coil spring 40A is formed integral with the boss portion of the clutch drum 33a. However, when a spline shaft portion which can be inserted into the axial hollow portion of the existing clutch boss is formed integral with the clutch drum 33a side of the cylindrical connector 35, the interchangeability of the parts can be advantageously enhanced.

What is claimed is:

1. A portable brush cutter including an elongated member, the brush cutter comprising:
   a cutting blade mechanism at a distal end of the elongated member; and
   a prime mover including an output shaft for driving the cutting blade mechanism via a transmission shaft installed inside the elongated member at a proximal end thereof;
   a vibration-absorbing coupler interposed between the output shaft of the prime mover and the transmission shaft, the coupler comprising:
      a torsion coil spring;
      a regulator to regulate the rotation of the torsion coil spring to prevent the spring from twisting more than a predetermined amount;
      a movable sleeve having spline female teeth which are slidably engaged with spline male teeth formed on the transmission shaft; and
      a cylindrical connector which is adapted to be rotated with the output shaft and in which the movable sleeve is slidably inserted;
   wherein
      the torsion coil spring is interposed between the movable sleeve and a spring shoe attached to the cylindrical connector, one end portion of the torsion coil spring being anchored to an anchor portion provided in the spring shoe and the other end portion thereof being anchored to an anchor portion provided in the movable sleeve; and
      the regulator is mounted on both of the movable sleeve and the cylindrical connector.

2. The portable brush cutter of claim 1, wherein the regulator comprises
   a protrusion or a pin attached to the movable sleeve, and
   a groove or a slot into which end portions of the protrusion or the pin are inserted;
   wherein a rotational range of the protrusion or the pin is regulated by the opposite end portions of the groove or the slot.

3. The portable brush cutter of claim 2, wherein the cylindrical connector includes a plurality of grooves or slots which are juxtaposed at predetermined intervals along the rotational axis thereof.

4. A portable brush cutter including an elongated member, the brush cutter comprising:
   a cutting blade mechanism at a distal end of the elongated member; and
   a centrifugal clutch coupled to an internal combustion engine for driving the cutting blade mechanism via a transmission shaft installed inside the elongated member at a proximal end thereof;
   a vibration-absorbing coupler interposed between the centrifugal clutch and the transmission shaft, the coupler comprising:
      a torsion coil spring;
      a regulator to regulate the rotation of the torsion coil spring to prevent the spring from twisting more than a predetermined amount;
      a movable sleeve having spline female teeth which are slidably engaged with spline male teeth formed on the transmission shaft; and
      a cylindrical connector which is adapted to be mounted with a boss portion of a drum of the centrifugal clutch and in which the movable sleeve is slidably inserted;
   wherein
      the torsion coil spring is interposed between the movable sleeve and a spring shoe attached to the cylindrical connector, one end portion of the torsion coil spring being anchored to an anchor portion provided in the spring shoe and the other end portion thereof being anchored to an anchor portion provided in the movable sleeve; and
      the regulator is mounted on both of the movable sleeve and the cylindrical connector.

5. The portable brush cutter of claim 4, wherein the regulator comprises
   a protrusion or a pin attached to the movable sleeve, and
   a groove or a slot into which end portions of the protrusion or the pin are inserted;
   wherein a rotational range of the protrusion or the pin is regulated by the opposite end portions of the groove or the slot.

6. The portable brush cutter of claim 5, wherein the cylindrical connector includes a plurality of grooves or slots which are juxtaposed at predetermined intervals along the rotational axis thereof.

* * * * *